L. S. STACEY.
STOP COCK.
APPLICATION FILED MAY 14, 1909.
963,403.
Patented July 5, 1910.
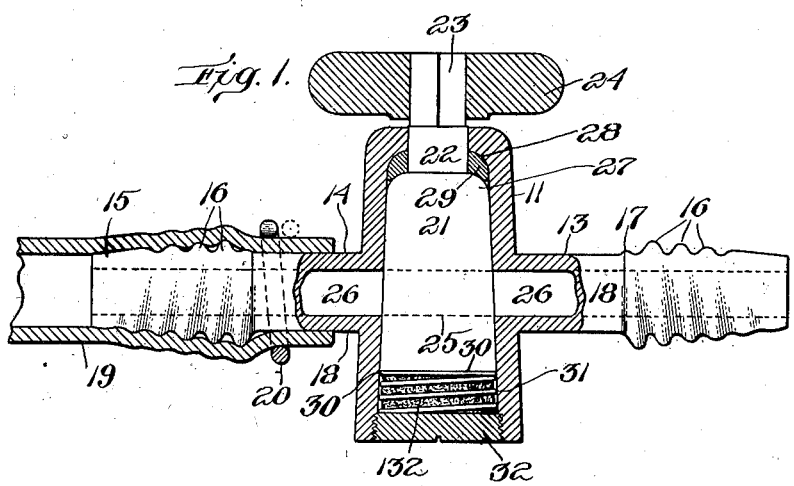
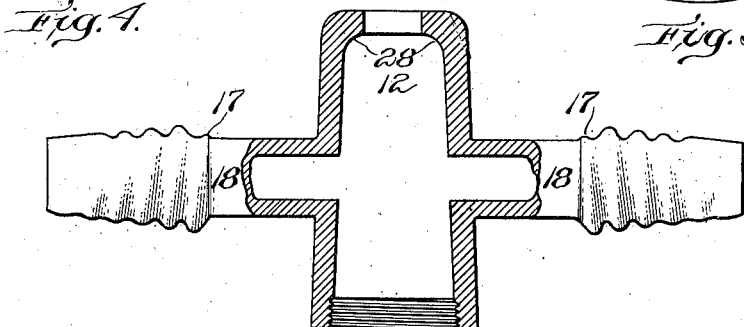
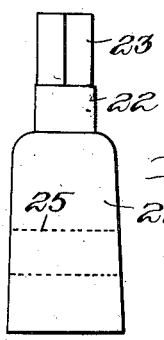
Witnesses:
R. Wallace
John H. Parker
Inventor:
Lyman S. Stacey
by Macleod, Calver, Copeland & Dike
Attys.

UNITED STATES PATENT OFFICE.

LYMAN S. STACEY, OF QUINCY, MASSACHUSETTS.

STOP-COCK.

963,403.

Specification of Letters Patent.   Patented July 5, 1910.

Application filed May 14, 1909. Serial No. 496,062.

*To all whom it may concern:*

Be it known that I, LYMAN S. STACEY, a citizen of the United States, residing at Quincy, in the county of Norfolk, State of Massachusetts, have invented a certain new and useful Improvement in Stop-Cocks, of which the following is a specification, reference being had therein to the accompanying drawings.

My invention has for its object an improvement in stop cocks of the kind employed in hose or other pipes such as are used to convey compressed air to pneumatic tools, and the like.

The particular object of my invention is to provide a stop cock which shall be less likely to leak than those heretofore employed; which shall be constantly and automatically lubricated; and which may be attached to and detached from the hose with less danger of injury to the hose and more rapidly than has heretofore been possible.

The stop cock embodying my invention is no more expensive to construct than those at present employed, but by reason of my invention much less difficulty is experienced in its use than with stop cocks as heretofore constructed. The stop cock embodying my invention will also by reason of its peculiar construction remain in good order for a much longer time than those heretofore employed.

The invention will be fully understood from the following description taken in connection with the accompanying drawings, and the novel features are pointed out and clearly defined in the claims at the close of this specification.

In the drawings,—Figure 1 is an elevation partly in section of a stop cock embodying my invention. Fig. 2 is a similar view of the body of the stop cock. Fig. 3 is an elevation of the movable valve member. Fig. 4 is a view of the packing and spring, removed. Fig. 5 is a view of the cap which closes the central opening of the stop cock.

Referring now to the drawings and more particularly to Figs. 1 and 2—there will be seen at 11 the body of the stop cock having at 12 a tapered central cavity to receive the movable valve member. The body 11 of the stop cock is provided with two tubular arms 13 and 14 to receive the hose in the line of which the stop cock is located, or if desired one of these arms may be constructed for connection with the hose, while the other may be threaded for connection with the pneumatic tool. When employed for connection to a hose, a tapering nipple having a smooth end 15 of a diameter slightly less than the bore of the hose and round screw threads 16 ending in a sharp shoulder 17 is employed. Between the shoulder 17 and the body of the cock 11 is a neck or constricted portion 18. From the foregoing it will be seen that the hose 19 is screwed onto the nipple until the end of the hose passes the sharp shoulder 17 and lies along the neck or constricted portion 18, nearly in contact with the body of the stop cock as shown in Fig. 1. When thus constructed the stop cock may be readily attached to the hose or detached therefrom without injury to the hose and will remain connected to a hose even after it has become softened and weakened by constant use. If desired a spring band 20 may be employed. This is desirable where the hose is very poor.

The valve member 21 is tapered as shown in Fig. 3 with its large end at the bottom and a stem 22 squared as shown at 23 to receive a handle 24 at the top. The port 25 registers when the valve is open with the two passages 26 through the two arms 13 and 14. The shoulder of the valve member 21 is rounded as shown at 27, and the interior of the body of the stop cock is similarly rounded as shown at 28. The movable valve member 21 is of such a size that the shoulder 27 will not rest against the rounded portion 28 and a packing 29 of any suitable fibrous material, such as impregnated waste, is placed between the shoulder 27 and the rounded portion of the bore of the body of the stop cock. It will be seen that any air which gets by the valve member 21 into the cavity in which the packing 29 is contained will exert a pressure upon the packing and hold the packing tightly about the valve stem 22, thereby preventing it escaping about the stem.

The valve member 21 is considerably shorter than the interior cavity 12 of the body of the stop cock. Next to the bottom face of the valve member is placed a washer 30 against which presses the spiral spring 31 (see Figs. 1 and 4) which is of a diameter nearly that of the movable valve member. The bottom of the cavity 12 is tightly closed by the screw cap 32 and this screw cap 32 compresses the spring against the washer 30 and the movable valve member 21 so that the movable valve member 21 is forced up into the cavity and tends to remain seated in the cavity 12 in spite of wear on the respective surfaces of the valve member and valve body. The spring 31 is so proportioned that the user may press the spring down by the handle 24 if desired. The space within the spiral spring 31 is occupied by a porous packing 132 which is capable of absorbing lubricating oil. In practice I use ordinary cotton waste. This waste is thoroughly saturated with oil before the screw cap 32 is put in place. When the user turns the handle 24 of the stop cock in either direction he ordinarily presses down slightly on the handle 24 since the movable valve member being forced up into the tapering cavity 12 tends to stick slightly. The downward movement of the valve member by this action compresses slightly the saturated waste and the oil which is forced out of the waste is driven up around the movable valve member between it and the walls of the stop cock body lubricating this thoroughly. When the operator takes his hand off the handle the pressure is released and the valve member is forced upward by the spring 31 into its usual position. This causes most of the oil to flow back again into the packing 132 but leaves a film adhering to the parts which is sufficient to lubricate them thoroughly.

I find in practice that in valves embodying my invention the parts are constantly lubricated and that the small amount of oil necessary to saturate the packing will keep the parts in proper condition for a very considerable length of time.

The washer 30 which is placed between the spring 31 and the movable valve member 21 protects the bottom of the valve member from the spring 31. The valve member would otherwise be likely to be scored by the spring which is much harder than the material of which the valve member is made and this scoring would cause the valve to stick and the particles from the valve member would work between the valve member and its seat and cause leakage. By interposing the washer between the valve member and the spring all wear on the valve member is obviated since the washer remains still and the valve member turns on the washer.

What I claim is:

1. An improved stop cock comprising a valve-body having a tapering valve-seat, a tapering valve-member located therein, a compressible absorbent packing capable of containing a fluid lubricant located between a portion of the valve-member and a portion of the valve-seat, and a spring to hold the valve-member normally in contact with its seat, whereby lubricant is forced out of the packing whenever the valve-member is moved off its seat.

2. The improved stop cock having a tapering valve-member, a valve body having a correspondingly tapering valve-seat, a compressible absorbent packing capable of containing a lubricant, said packing being compressed when the valve-member is moved off its seat, and a spring to hold the valve-member normally in contact with its seat.

3. The improved stop cock having a tapering valve-member, a valve-body having a correspondingly tapering valve-seat, a compressible absorbent packing capable of containing a lubricant, a spring to hold the valve-member normally in contact with its seat, and a handle on said valve-member, said handle being located opposite to said packing, whereby the pressure applied to the handle in turning the valve-member tends to compress the packing and force the lubricant out of the packing.

4. The improved stop-cock comprising a valve body having a tapering valve seat, a tapering valve member, a cap closing the cavity formed in said valve body by said tapering valve seat, a compressible absorbent packing capable of containing lubricant between the said valve member and the said cap, said packing being compressed when the valve member is moved off its seat, and a spring tending to hold the said valve member in contact with its seat.

In testimony whereof I affix my signature, in presence of two witnesses.

LYMAN S. STACEY.

Witnesses:
  GEORGE P. DIKE,
  ALICE H. MORRISON.